US008560675B2

(12) United States Patent
Honnold et al.

(10) Patent No.: US 8,560,675 B2
(45) Date of Patent: Oct. 15, 2013

(54) DETERMINING PROJECTION WEIGHTS BASED ON A CENSUS DATA

(75) Inventors: Douglas J. Honnold, Evanston, IL (US); Joseph Lahr, Fairfax, VA (US); Cameron S. Meierhoefer, Washington, DC (US); Frank E. Pecjak, Fairfax, VA (US)

(73) Assignee: comScore, Inc., Reston, VA (US)

( * ) Notice: Subject to any disclaimer, the term of this patent is extended or adjusted under 35 U.S.C. 154(b) by 626 days.

(21) Appl. No.: 12/752,231

(22) Filed: Apr. 1, 2010

(65) Prior Publication Data

US 2011/0004682 A1 Jan. 6, 2011

Related U.S. Application Data

(60) Provisional application No. 61/165,870, filed on Apr. 1, 2009, provisional application No. 61/175,941, filed on May 6, 2009.

(51) Int. Cl.
*G06F 15/173* (2006.01)

(52) U.S. Cl.
USPC .......................................... 709/224; 709/223

(58) Field of Classification Search
USPC .................................................. 709/224, 223
See application file for complete search history.

(56) References Cited

U.S. PATENT DOCUMENTS

| 5,490,060 | A | 2/1996 | Malec et al. |
| 6,230,204 | B1* | 5/2001 | Fleming, III ................... 709/229 |
| 7,020,082 | B2* | 3/2006 | Bhagavath et al. ........... 370/230 |
| 7,376,722 | B1 | 5/2008 | Sim et al. |
| 7,644,422 | B2* | 1/2010 | Lu et al. ............................. 725/9 |
| 7,702,779 | B1* | 4/2010 | Gupta et al. ................... 709/224 |
| 8,239,522 | B1* | 8/2012 | Luby et al. ..................... 709/224 |
| 8,260,739 | B1* | 9/2012 | Pelletier ............................ 700/2 |
| 2003/0074606 | A1* | 4/2003 | Boker ............................. 714/42 |
| 2003/0171977 | A1 | 9/2003 | Singh et al. |
| 2004/0019518 | A1* | 1/2004 | Abraham et al. ............... 705/10 |

(Continued)

FOREIGN PATENT DOCUMENTS

WO WO9826529 A2 6/1998

OTHER PUBLICATIONS

PCT International Search Report and Written Opinion issued in International Application No. PCT/US10/29573 on May 25, 2010, 14 pages.

(Continued)

*Primary Examiner* — Waseem Ashraf
(74) *Attorney, Agent, or Firm* — Fish & Richardson P.C.

(57) ABSTRACT

Projection weights may be configured to project usage of a first set of resources by users of a first group of clients systems to usage of the first set of resources by users in a larger group of users. Users of the first group of client systems may be a sample of a larger group of users that access resources on the network using client systems. The projection weights may be determined based on a first set of usage data and a second set of usage data. The first set of usage data may be determined based on information received from monitoring applications installed on a first group of client systems. The second set of usage data may be determined based on information received from a second group of client systems sent as a result of beacon instructions included with a second set of resources accessed by the second group of client systems.

10 Claims, 4 Drawing Sheets

(56) References Cited

U.S. PATENT DOCUMENTS

| | | | |
|---|---|---|---|
| 2004/0243704 A1* | 12/2004 | Botelho et al. | 709/224 |
| 2005/0066011 A1* | 3/2005 | Wicks | 709/217 |
| 2007/0011304 A1 | 1/2007 | Error | |
| 2007/0112840 A1* | 5/2007 | Carson et al. | 707/102 |
| 2008/0086741 A1* | 4/2008 | Feldman et al. | 725/13 |
| 2008/0189408 A1* | 8/2008 | Cancel et al. | 709/224 |
| 2008/0249905 A1* | 10/2008 | Wong et al. | 705/34 |
| 2010/0030785 A1* | 2/2010 | Wilson et al. | 707/10 |
| 2010/0191847 A1* | 7/2010 | Raleigh | 709/224 |

OTHER PUBLICATIONS

Steve Coffey, "Internet Audience Measurement: A Practitioner's View," Journal of Interactive Advertising, ISSN 1525-2019, vol. 1, No. 2, Spring 2001, pp. 10-17.

Rex Briggs et al., "The Ecological Inference Problem in Internet Measurement: Leveraging Web Site Log Files to Uncover Population Demographics and Psychographics," Collected Working Papers, INFORMS College of Marketing Mini-Conference, MIT Sloan School, Cambridge, MA, Mar. 6-8, 1998, 19 pages.

Sternstein et al, "Digital Planet announces creation of Netcount; 'Nielsens for the Net' creates vast new marketing potential for World Wide Web," Business Wire, Apr. 19, 1995, 2 pages.

Kirthi Kalyanam et al., "Data Reconciliation, Reducing Discrepancies in Audience Estimates From Web Servers and Online Panels," IAB/ARF/FAST Summit Measurement Committees, Oct. 4, 1999, 39 pages.

European Office Action for Application No. 10759383.2 dated Feb. 2, 2012, 7 pages.

* cited by examiner

DETERMINING PROJECTION WEIGHTS BASED ON A CENSUS DATA

CLAIM OF PRIORITY

This application claims priority under 35 USC §119(e) to U.S. Patent Application Ser. No. 61/165,870, filed on Apr. 1, 2009, and titled "DETERMINING PROJECTION WEIGHTS BASED ON CENSUS DATA" and U.S. Patent Application Ser. No. 61/175,941, filed on May 6, 2009, and titled "DETERMINING PROJECTION WEIGHTS BASED ON CENSUS DATA." The entire contents of all of these applications are hereby incorporated by reference.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, a system includes one or more processing devices and one or more storage devices. The one or more storage devices store instructions that, when executed by the one or more processing devices, cause the one or more processing devices to perform a number of operations. The instructions cause the one or more processing devices to access a first set of usage data for a first set of resources on a network. The first set of usage data is determined based on information received from monitoring applications installed on a first group of client systems that accessed the first set of resources. The users of the first group of client systems are a sample of a larger group of users that use resources on the network. The instructions cause the one or more processing devices to access a second set of usage data for a second set of resources on the network. The second set of resources were accessed by a second group of client systems and the second set of usage data is determined based on information received from the second group of client systems sent as a result of beacon instructions included with the second set of resources. The instructions cause the one or more processing devices to determine projection weights based on the first set of usage data and the second set of usage data. The determined projection weights are configured to project usage of the first set of resources by the users of the first group of clients systems to usage of the first set of resources by users in a larger group of users. The instructions cause the one or more processing devices to apply the projection weights to the first set of usage data to generate projected usage data that reflects usage of the first set of resources by users in the larger group of users and to generate one or more reports regarding usage of one or more of resources in the first set of resources based on the projected usage data.

Implementations may include one or more of the following features. For example, the second set of resources may include at least one resource included in the first set of resources and the second group of client systems may include at least one client system included in the first group of client systems and at least one client system not included in the first group of client systems. The second set of resources may include web pages and the beacon instructions may include script included in the web pages. The script may be configured to send a message to a collection server and the message may include a uniform resource locator corresponding to the web page in which the script is included. The monitoring application may be configured to monitor network activity of the client systems on which the monitoring application is installed, to collect information about the monitored network activity, and to send the collected information to a collection server.

To determine the projection weights based on the first set of usage data and the second set of usage data, the instructions may include instructions that cause the one or more processing devices to determine values of the projection weights that minimize an error between a usage measurement determined based on the second set of usage data and an estimate of the usage measurement determined by applying the projection weights to usage information determined based on the first set of usage data. The usage measurement may reflect usage of one or more of the resources in the second set of resources and may include a number of times resources in the second set of resources were accessed.

In another aspect, a method includes executing instructions on one or more processing devices such that the one or more processing devices perform a number of operations. The one or more processing devices access a first set of usage data for a first set of resources on a network. The first set of usage data is determined based on information received from monitoring applications installed on a first group of client systems that accessed the first set of resources. The users of the first group of client systems are a sample of a larger group of users that use resources on the network. The one or more processing devices access a second set of usage data for a second set of resources on the network. The second set of resources were accessed by a second group of client systems and the second set of usage data is determined based on information received from the second group of client systems sent as a result of beacon instructions included with the second set of resources. The one or more processing devices determine projection weights based on the first set of usage data and the second set of usage data. The determined projection weights are configured to project usage of the first set of resources by the users of the first group of clients systems to usage of the first set of resources by users in a larger group of users. The one or more processing devices apply the projection weights to the first set of usage data to generate projected usage data that reflects usage of the first set of resources by users in the larger group of users and o generate one or more reports regarding usage of one or more of resources in the first set of resources based on the projected usage data.

Implementations may include one or more of the following features. For example, the second set of resources may include at least one resource included in the first set of resources and the second group of client systems may include at least one client system included in the first group of client systems and at least one client system not included in the first group of client systems. The second set of resources may include web pages and the beacon instructions may include script included in the web pages. The script may be configured to send a message to a collection server and the message may include a uniform resource locator corresponding to the web page in which the script is included. The monitoring application may be configured to monitor network activity of the client systems on which the monitoring application is installed, to collect information about the monitored network activity, and to send the collected information to a collection server.

To determine the projection weights based on the first set of usage data and the second set of usage data, the instructions may include instructions that cause the one or more processing devices to determine values of the projection weights that minimize an error between a usage measurement determined based on the second set of usage data and an estimate of the usage measurement determined by applying the projection weights to usage information determined based on the first set of usage data. The usage measurement may reflect usage of one or more of the resources in the second set of resources and may include a number of times resources in the second set of resources were accessed.

In another aspect, a system includes one or more processing devices and one or more storage devices. The one or more storage devices store instructions that, when executed by the one or more processing devices, cause the one or more processing devices to perform a number of operations. The instructions cause the one or more processing devices to access a first set of data indicating a first set of resources on a network accessed by a first group of client systems. Users of the first group of client systems are a sample of a larger group of users that access resources on the network using client systems. The instructions cause the one or more processing devices to access a second set of data indicating a second set of resources on the network accessed by a second group of client systems. The second set of resources includes at least one resource included in the first set of resources and the second group of client systems includes at least one client system included in the first group of client systems and at least one client system not included in the first group of client systems. The instructions cause the one or more processing devices to determine projection weights based on the first set of data and the second set of data. The projection weights project one or more counts of accesses of one or more resources in the first set of resources by the users of the first group of clients systems during a period of time to one or more counts of accesses of one or more resources in the first set of resources by users in the larger group of users during the period of time. The instructions cause the one or more processing devices to apply the projection weights to the one or more counts of accesses of one or more resources in the first set of resources by the users of the first group of clients systems during a period of time to obtain the one or more counts of accesses of one or more resources in the first set of resources by users in the larger group of users during the period of time. The instructions cause the one or more processing devices to generate one or more reports regarding access of one or more resources in the first set of resources by users in the larger group of users during the period of time based on the one or more counts of accesses of one or more resources in the first set of resources by users in the larger group of users during the period of time.

Implementations may include one or more of the following features. For example, the first set of data may be determined based on information received from monitoring applications installed on the first group of client systems. The second set of data may be determined based on messages received from the second group of client systems sent as a result of beacon instructions included with the second set of resources. The first or second set of resources may include web pages and the beacon instructions may include script included in the web pages in the second set of resources. To determine projection weights based on the first set of data and the second set of data, the instructions include instructions that cause the one or more processing devices to determine values of the projection weights that minimize an error between (i) a first count of accesses of the resources in the second set of resources determined based on the second set of data and (ii) an estimate of a number of accesses of the resources in the second set of resources determined by applying the projection weights to a second count of accesses to the second set of resources determined based on the first set of data.

In yet another aspect, a system includes a first group of client systems, a second group fo client systems, one or more resource servers, and one or more servers. The first group of client systems are configured to access resources on a network. A monitoring application is installed on each of the client systems in the first group. The monitoring application is configured to collect information about usage of resources on the network by the client system on which the monitoring application is installed and to send the collected information to one or more servers.

Each of the resource servers are configured to store one or more resources. The stored resources include instructions that, when executed by a client system, cause the client system to send information about usage of the stored resources by the client system to one or more servers.

The second group of client systems are configured to access resources on the network. At least a portion of the resources accessed by the second group of client systems include the resources stored by the one or more resource servers such that the client systems in the second group of client systems execute the instructions included in the stored resources and send information about usage of the stored resources by the client systems in the second group to one or more servers.

The one or more servers are configured to receive the information sent by the monitoring applications; receive the information sent by the client systems in the second group of client systems; determine a first set of usage data for a first set of resources on the network based on the information received from the monitoring applications; determine a second set of usage data for a second set of resources on the network based on the information received from the client systems in the second group of client systems; determine projection weights based on the first set of usage data and the second set of usage data, wherein the determined projection weights are configured to project usage of the first set of resources by the users of the first group of clients systems to usage of the first set of resources by users in a larger group of users; apply the projection weights to the first set of usage data to generate projected usage data that reflects usage of the first set of resources by users in the larger group of users; and generate one or more reports regarding usage of one or more of resources in the first set of resources based on the projected usage data.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

Figure 1:
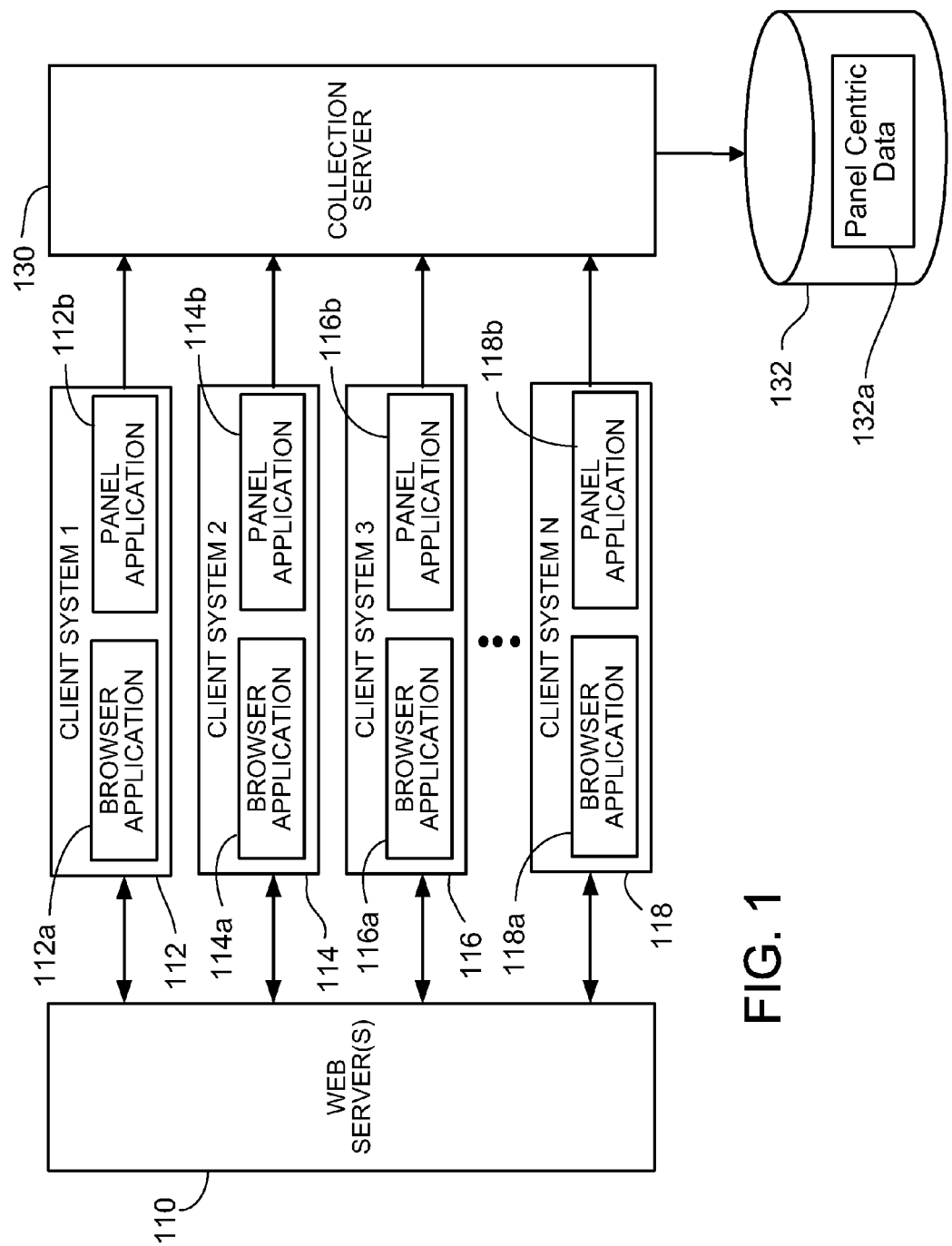
FIG. 1 illustrates an example of a system in which a panel of users may be used to perform Internet audience measurement.

FIG. 1 illustrates an example of a system 100 in which a panel of users may be used to perform Internet audience measurement. The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

The users in the panel may be recruited by an entity controlling the collection server 130, and the entity may collect various demographic information regarding the users in the panel, such as age, sex, household size, household composition, geographic region, and household income. The techniques chosen to recruit users may be chosen or developed to help insure that a good random sample of the universe being measured is obtained, biases in the sample are minimized, and the highest manageable cooperation rates are achieved. Once a user is recruited, a monitoring application is installed on the user's client system to collect the information about the user's use of the client system to access resources on the Internet and to send that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112b, 114b, 116b, and 118b, also referred to as a panel application, is installed on each of the client systems 112, 114, 116, and 118. Accordingly, when a user of one of the client systems 112, 114, 116, or 118 employs, for example, a browser application 112a, 114a, 116a, or 118a to visit and view web pages, information about these visits may be collected and sent to the collection server 130 by the monitoring application 112b, 114b, 116b, and 118b. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). The collection server 130 receives and records this information. The collection server 130 aggregates the recorded information from the client systems and stores this aggregated information in the database 132 as panel centric data 132a.

The panel centric data 132a may be analyzed to determine the visitation or other habits of users in the panel, which may be extrapolated to the larger population of all Internet users. The information collected during a particular time period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample (those included in the weighting and projection) are weighted to insure that the reporting sample reflects the demographic composition of the universe to be measured, and this weighted sample is projected to the universe. This may be accomplished by determining a projection weight for each member of the reporting sample and applying that projection weight to the usage of that member. As described further below, the projection weight for each member may be determined by taking into account site centric, or census level, traffic data for web pages or groups of web pages. Site centric, or census level, traffic data may be collected by including beacon code in one or more web pages served by the web servers 110, as described further with respect to FIG. 2.

The usage behavior of the weighted and projected sample is then considered a representative portrayal of the behavior of the defined universe. Behavioral patterns observed in the weighted, projected sample are assumed to reflect behavioral patterns in the universe.

Reports can be generated from this information. For example, this data may be used to estimate the number of unique visitors visiting certain web pages or groups of web pages, or unique visitors within a particular demographic visiting certain web pages or groups of web pages. This data may also be used to determine other estimates, such as the frequency of usage per user, average number of pages viewed per user, and average number of minutes spent per user.

Figure 2:
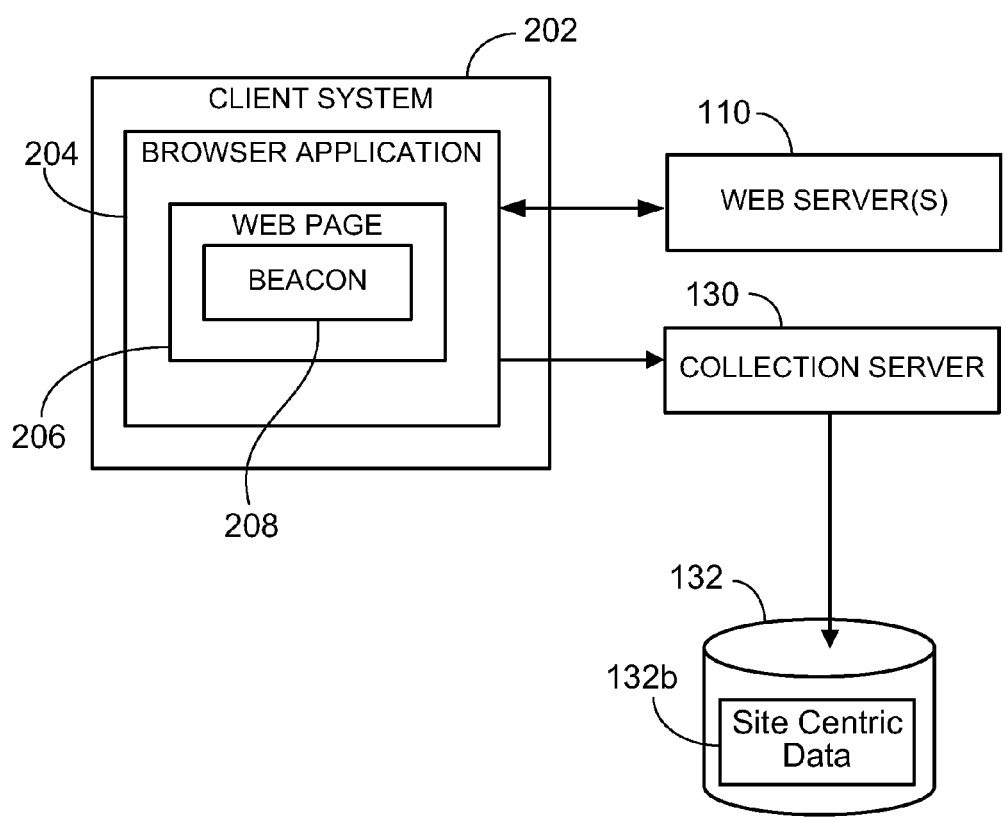
FIG. 2 illustrates an example of a system in which site centric data can be obtained by including beacon code in one or more web pages.

Referring to FIG. 2, site centric data can be obtained by including beacon code in one or more web pages. System 200 includes one or more client systems 202, the web servers 110, the collection servers 130, and the database 132. The client systems 202 can include client systems 112, 114, 116, or 118, which have the panel application installed on them, as well as client systems that do not have the panel application installed.

The client systems include a browser application 204 that retrieves web pages 206 from web servers 110 and renders the retrieved web pages. Some of the web pages 206 include beacon code 208. In general, publishers of web pages may agree with the entity operating the collection server 130 to include this beacon code in some or all of their web pages. This code 208 is rendered with the web page in which the code 208 is included. When rendered, the code 208 causes the browser application 204 to send a message to the collection server 130. This message includes certain information, such as the URL of the web page in which the beacon code 208 is included. For example, the beacon code may be JavaScript code that accesses the URL of the web page on which the code is included, and sends to the collection server 130 an HTTP Post message that includes the URL in a query string. Similarly, the beacon code may be JavaScript code that accesses the URL of the web page on which the code is included, and includes that in the URL in the "src" attribute of an <img> tag, which results in a request for the resource located at the URL in the "src" attribute of the <img> tag to the collection server 130. Because the URL of the webpage is included in the "src" attribute, the collection server 130 receives the URL of the webpage. The collection server 130 can then return a transparent image. The following is an example of such JavaScript:

```
<script type="text/javascript">
document.write("<img id='img1' height='1'
width='1'>");document.getElementById("img1").src=
"http://example.com/scripts/report.dll?C7=
" + escape(window.location.href) + "&rn="
+ Math.floor(Math.random( )*99999999);
</script>
```

The collection server 130 records the webpage URL received in the message with, for instance, a time stamp of when the message was received and the IP address of the client system from which the message was received. The collection server 130 aggregates this recorded information and stores this aggregated information in the database 132 as site centric data 132b.

Thus, as users of client systems 202 access web pages on the Internet, they access the web pages that include the beacon code, which results in a message being sent to the collection server 130. These messages indicate that the web page was accessed. Further, this occurs regardless of whether or not the given client system has the panel application installed. But, for client systems in which the panel application is installed, the panel applications also records and reports the beacon message to the collection server 130. For example, if the panel application is recording HTTP traffic, and the beacon message is sent using an HTTP Post message (or as a result of an <img> tag), then the beacon message is recorded as part of the HTTP traffic recorded by the panel application. Thus, in this instance, the collection server 130 receives the beacon message as a result of the beacon code, and a report of the beacon message as part of the panel application recording and reporting network traffic.

Because the beacon message is sent regardless of whether the panel application is installed, the site centric data 132b represents accesses by the members of the larger universe to be measured, not just the members of the panel. However, since receipt of this information relies on publishers of web pages placing the beacon code in their web pages, this information may not be available for all web pages or groups of web pages visited and, therefore, those web pages or groups of web pages are not measured using the beacons. Furthermore, it may not be possible to determine individual users based on the beacon messages alone, or to determine other information such as unique visitors. Thus, it may still be desirable to use the panel centric data to perform audience measurement, so that web pages that do not include beacon code are measured and so that the measurements can be person centric. But, the beacon data can be used to enrich the panel centric data by using this data to calculate the projection weights. Doing so may allow the panel data to more closely reflect actual usage, as measured by the beacon messages, of the beaconed web pages as well as those web pages that do not include the beacon code.

Figure 3:
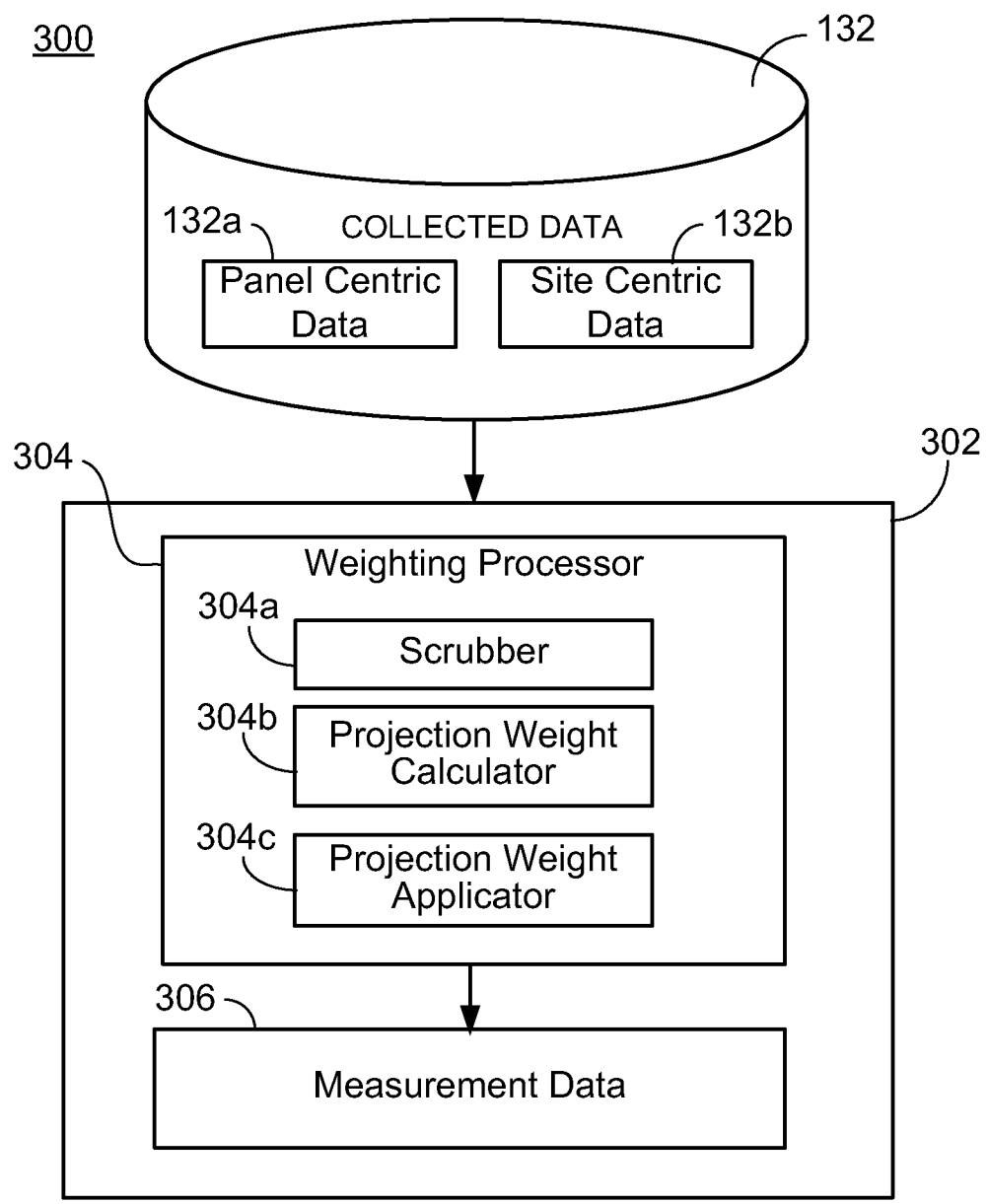
FIG. 3 illustrates an example of a system in which site centric data can be used to enrich data from a panel of users.

FIG. 3 illustrates an example of a system 300 in which panel centric data and site centric data can be used to generate projection weights for members of a panel, and these projection weights can be applied to the panel centric data to generate measurement data. The system 300 includes a reporting server 302. The reporting server 302 may be implemented using, for example, a general-purpose computer capable of responding to and executing instructions in a defined manner, a personal computer, a special-purpose computer, a workstation, a server, or a mobile device. The reporting server 302 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 302.

The reporting server 302 executes instructions that implement a weighting processor 304, which includes a pre-processing module 304a, a projection weight calculator 304b, and a projection weight applicator 304c. The weighting processor 304 may implement a process, such as that shown in FIG. 4, that accesses the panel centric data 132a and the site centric data 132b from the database 132, determines the projection weight for the reporting sample of the panel based on the panel centric data 132a and the site centric data 132b, and applies those projection weights appropriately to obtain the desired measurement data 306.

Figure 4:
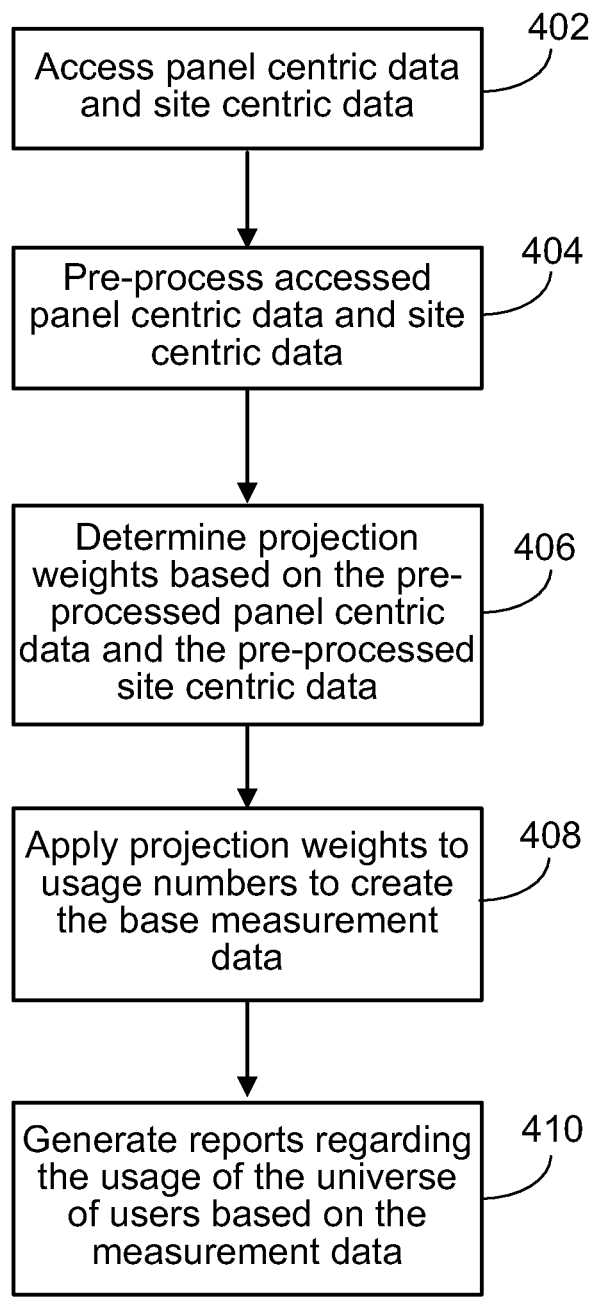
FIG. 4 is a flow chart illustrating an example of a process that may be performed to determine projection weights for members of a panel based on panel centric data and site centric data, and apply those projection weights to the panel centric data to generate measurement data.

FIG. 4 is a flow chart illustrating an example of a process 400 that may be performed to determine projection weights for members of a panel based on panel centric data and site centric data, and apply those projection weights to the panel centric data to generate measurement data. The following describes process 400 as being performed by the pre-processing module 304a, the projection weight calculator 304b, and the projection weight applicator 304c. However, the process 400 may be performed by other systems or system configurations.

The pre-processing module 304a accesses the panel centric data 132a and site centric data 132b (402). As described above, the panel centric data 132a indicates a first set of resources accessed by a first set of client systems (those in the panel) and the site centric data 132b indicates a second set of resources accessed by a second set of client systems, with some of the second set of client systems potentially being in the panel and some of the second set of client systems potentially not being in the panel. Further, the second set of resources may include one or more resources that are also included in the first set of resources.

The pre-processing module 304a performs one or more pre-processing functions on the accessed panel centric data 132a and the accessed site centric data 132b (404). For example, the pre-processing module 304a may process the raw panel centric data 132a to form state data that represents the complete fact of usage in a single record. For instance, for web page visitation, a record in the state data may indicate that a particular user, on a particular date, at a particular time, accessed web page B (as represented by the URL for that web page). The pre-processing module 304a also may match some or all of the URLs in the records of the state data to patterns in a dictionary of the Internet, which may organize various different URLs into digital media properties, reflecting how the Internet companies operate their businesses. Each pattern may be associated with a web entity, which may be a web page or collection of web pages that are logically grouped together in a manner that reflects how Internet companies operate their business. For example, the various web pages that are included in the finance.yahoo.com domain may be logically grouped together into a single web entity (e.g., Yahoo Finance). The pre-processing module 304a may associate a given state record with the web entity associated with the pattern matching the URL in the state record.

The pre-processing module 304a may also remove from the panel centric data 132a records for users that are not to be included in the reporting sample. For example, there may be rules that are evaluated to insure that a complete record of a user's usage and non-usage during the reporting period is received. If those rules are not met, the user may be removed from the reporting sample. Also, a user may be removed if he or she does not meet certain criteria, such as being in a particular geographic area.

In addition, the pre-processing module 304a may remove certain records. For instance, records that reflect redirects or that reflect non-human initiated request (e.g., requests made as part of rendering a web page) may be removed.

The pre-processing module 304a may process the site centric data to remove certain records. For example, the pre-processing module 304a may remove non-human initiated accesses from the site centric data, accesses from client systems not located in a particular geographic region (which may be determined based on a reverse lookup of the client system's IP address), redirects, and/or accesses by bots. In addition, accesses performed using certain types of client systems may be removed. For example, client systems that are mobile client systems (e.g., smart phones) may be detected by the user agent of the client system (which may be captured with the beacon message) and removed. Similarly, shared use client systems (e.g., client systems available to the public in a library) may be detected by analyzing the network access provider based on a reverse look-up of the client system's IP address (which may be captured with the beacon message)

In some implementations, the pre-processing module 304a may align traffic that can be attributed to home machines and machines used in business. These two subpopulations can be identified in the panel in a similar fashion to demographic collection. To align the panelist traffic to site-centric traffic, the beacon messages received between 8 am and 6 pm local time Monday through Friday may be assumed to be work generated traffic. All other traffic may be aligned as targets for the Home sample.

In another example, a model may be developed based on observed work behavior in the panel (work and home machines are known in the panel). This model may be based on time of day and day of week usage profiles. If an IP address matches the expected profile for a work machine, all traffic for that IP address may be considered work traffic. For instance, panel data may indicate that, if the number of accesses during a first time period (a work time) is greater than the number of accesses during a second time period (a home time period) by a certain amount, then a machine is probably a work machine. This information may be used, together with the site-centric data, to classify network access providers into work or home based on the whether or not accesses by users of those network access providers occurs are greater during the work time than the home time, on average, by the certain amount. The network access provider of a given machine may then be determined based on that machine's IP address, and that machine may be classified as the same class as the network access provider.

This alignment may be used for establishing beacon targets for weighting only. Once weights are established, all traffic associated with a panelist may be reported regardless of day part association.

The projection weight calculator 304b determines projection weights based on the pre-processed panel centric data and the pre-processed site centric data (406). For instance, the projection weight calculator 304b may calculate the projection weights for each panel member in the reporting sample based on the pre-processed panel centric data and site centric data. In one implementation, the projection weight calculator 304b calculates the projection weights by solving a quadratic program that is defined as follows.

Let:

p=1, 2, ..., P=index for panelist e=1, 2, ..., E=index for web entity t=1, 2, ..., T=index for demographic target group B(e)=total number of beacon messages counted for web entity e b(e,p)=number of beacon messages counted for web entity e and panelist p D(t)=number of Internet users in target group t $$d(t, p) = \begin{cases} 1 & \text{if panelist } p \text{ is in target group } t \\ 0 & \text{otherwise} \end{cases}$$

ω(p)=projection weight for panelist p

The goal is to calculate projection weights (p) for the P panelists to minimize:

$$\Sigma_e\{(\Sigma_p b(e,p)\omega(p)) - B(e)\}^2 \qquad (1)$$

which is the sum, across web entities that employ the beacon code, of the squared differences of received beacons and estimates of received beacons derived by applying projection weights to beacon counts for panelists and taking sums across panelists by web entity. The differences are squared to promote minimization of differences for all web entities (if the differences were not squared, the goal might be achieved by compensating for large, positive differences for some web entities with large, negative differences for others) and so that large differences are treated as more than just proportionally worse than small differences.

The constraints to be satisfied are:

$$\Sigma_p d(t,p)\omega(p) = D(t) \text{ for } t=1,2,\ldots,T \qquad (2)$$

which are the requirements that the weights be distributed like all Internet users across genders, age groups, connection types, and values of other variables used to stratify samples (the target demographic groups). In addition, there is a requirement that all of the weights are positive:

$$\omega(p) > 0 \text{ for } p=1,2,\ldots,P \qquad (3)$$

It is not necessary to have a constraint that the sum of the weights equal the population size estimate, because that constraint can be satisfied by satisfying the constraints that the weights be distributed like all Internet users across genders, age groups and the other variables used to stratify samples.

The function (1) can be rewritten to make apparent that this minimization problem is a quadratic program. Let:
ω=[ω(1), ω(2), . . . , ω(P)]=1×N vector of projection weights
and let:
c=[c(1), c(2), . . . , c(P)]=1×N vector of coefficients
where $$c(p) = -2\Sigma_e B(e)b(e,p) \qquad (4)$$

Let:

$$Q = \begin{bmatrix} q(1,1) & \ldots & q(1,N) \\ \vdots & \ddots & \vdots \\ q(N,1) & \ldots & q(N,N) \end{bmatrix} = N \times N \text{ matrix of coefficients}$$

where $$q(i,j) = 2\Sigma_e b(e,i)b(e,j) \qquad (5)$$

And finally, let:

$$k = \Sigma_e B(e)^2 = \text{a constant} \qquad (6)$$

Then (1) can be rewritten as:

$$\tfrac{1}{2}\omega Q\omega^T + c\omega^T + k \qquad (7)$$

The constant term k can be dropped, since the value of ω that minimizes the value of the (7) will also minimize the value of the function without the constant. That leaves us with the objective function:

$$\tfrac{1}{2}\omega Q\omega^T + c\omega^T \qquad (8)$$

Minimization of an objective function with the form of (8) subject to linear constraints like those of (2) and (3) is a quadratic program. Since Q is a symmetric matrix, a standard algorithm for solving a quadratic program, such as the one employed by the SAS/OR procedure OPTQP, can be applied to find the projection weights that minimize the value of the objective function.

The projection weight calculator 304b can obtain the values B(e) by determining the number of beacon messages received for each web entity. For instance, the projection weight calculator 304b may access a dictionary that associates the URL in a beacon message with a particular web entity, apply the dictionary to the processed site centric data to determine which web entity each beacon message corresponds to, and then count the number of beacon messages for each web entity.

The values b(e,p) can be obtained using the information collected by the panel applications regarding the beacon messages. As described above, for client systems in which the panel application is installed, the panel application also records and reports the beacon message to the collection server 130. Thus, there are records in the panel centric data reflecting the beacons sent from individual panel members. Accordingly, the panel centric data can be accessed, and the beacon messages for a given panelist and web entity can be counted.

The values d(t,p) may be determined based on the information collected for a given panelist when the panelist was recruited. This information may be stored and accessed by the projection weight calculator 304b for each panelist while calculating the projection weights. The values D(t) may be determined based on the independent measurements or studies of the universe to be measured. This information also may be stored and accessed by the projection weight calculator 304b for each target demographic while calculating the projection weights.

Alternatively, rather than minimizing the difference between the total beacon messages (total page views) and an estimate of the total beacon messages, the process 400 may determine the projection weights by minimizing the difference between the unique beacon messages (representing unique visitors) and an estimate of unique beacon messages determined using the projection weights. In other words, B(e) may represent the unique number of beacon messages counted for web entity e, with b(e,p) being set to 1.

The value of B(e) for a given web entity e may be determined simply by counting the number of unique beacon messages received for the entity e. This may be accomplished, for example, by setting a cookie with a unique identifier on the client systems when the client systems first send a beacon message (or send a beacon message without a cookie). The count can be further processed using information from the panel-centric data. For instance, the panel centric data can be used to determine an average number of cookies-per-person and/or machines used-per-person, both of which may artificially inflate the number of unique beacon messages. These values then may be used to reduce the count of unique beacons per web entity appropriately.

The projection weight applicator 304c applies the projection weight for each member of the reporting sample to the usage numbers for that member to create the base measurement data 306 (408). For example, for visitation data, the projection weight for each member is multiplied against that member's number of visits to each web entity visited by the member (as measured by the panel application) during the reporting period to project that member's number of visits to each web entity to the universe of users.

The reporting server 302 can then generate reports regarding the usage of the universe of users based on the measurement data (410). For example, to determine the total number of page views for a particular web entity, the reporting server 302 can add up the projected number of visits of each member that visited the web entity during the reporting period. The usage reports also may be generated based on specific demographics, such as age or sex. For instance, to determine the total number of page views for a particular web entity attributable to males between the ages of 18-35, the reporting server 302 may identify the panelists that meet the demographic characteristics (based on the information obtained when the panelist was recruited) and visited the web entity, and then add up the projected number of visits of each of those identified panelists during the reporting period. Other reports may additionally or alternatively be generated. For instance, the number of unique visitors visiting certain web pages or groups of web pages, or unique visitors within a particular demographic visiting certain web pages or groups of web pages may be reported, as well as other metrics such as the frequency of usage per user, average number of pages viewed per user, and average number of minutes spent per user.

The foregoing techniques may include one or more advantages. For instance, using the beacon data to determine the projection weights may allow for improvements in the measurements of all sites, not just those that include the beacon code. In this case, website publishers that employ beacon may see page view and unique visitor counts that accurately reflect the beacon site centric targets while comparable publishers who do not beacon, in contrast, may also see page view and unique visitor count adjustments to their normally panel derived estimates based on the cross-visitation of panelists. Developing weights based on the site centric data may effectively weight individuals and permit their cross visitation patterns as captured by the panel data to benefit all publishers, whether they beacon or not.

Also, for instance, using the beacon data to determine the projection weights may allow for more accurate measurements during times when the data from the panel is not as reflective of actual usage, or is sparse. For instance, it may be difficult to get users to install a monitoring application on their work computer. Therefore, panel data during work time hours may not be as reflective of actual usage because members of the panel are not using client systems with the panel application installed. Developing the weights based on the site centric data may bring the measurement data more in line with actual usage during such times.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A system comprising:
   one or more processing devices;
   one or more storage devices storing instructions that, when executed by the one or more processing devices, cause the one or more processing devices to perform the following operations:
      access a first set of usage data for a first set of resources on a network, the first set of usage data being determined based on information received from monitoring applications installed on a first group of client systems that accessed the first set of resources, wherein users of the first group of client systems are a sample of a larger group of users that use resources on the network;
      access a second set of usage data for a second set of resources on the network, the second set of resources having been accessed by a second group of client systems and the second set of usage data being determined based on information received from the second group of client systems sent as a result of beacon instructions included with the second set of resources;
      determine projection weights based on the first set of usage data and the second set of usage data, wherein the determined projection weights are configured to project usage of the first set of resources by the users of the first group of clients systems to usage of the first set of resources by users in a larger group of users, and wherein determining the projection weights includes:
dividing the first set of usage data into multiple subsets of data;
determining targets for each of the multiple subsets of data based on the second set of usage data; and
determining the projection weights by reducing an error represented by a difference between the determined targets and weighted values derived from the first set of usage data;
apply the projection weights to the first set of usage data to generate projected usage data that reflects usage of the first set of resources by users in the larger group of users; and
generate one or more reports regarding usage of one or more of resources in the first set of resources based on the projected usage data.

2. The system of claim 1, wherein the second set of resources includes at least one resource included in the first set of resources and the second group of client systems includes at least one client system included in the first group of client systems and at least one client system not included in the first group of client systems.

3. The system of claim 1, wherein the second set of resources comprise web pages and the beacon instructions comprise script included in the web pages.

4. The system of claim 3, wherein the script is configured to send a message to a collection server, wherein the message includes a uniform resource locator corresponding to the web page in which the script is included.

5. The system of claim 1, wherein the monitoring application is configured to monitor network activity of the client systems on which the monitoring application is installed, to collect information about the monitored network activity, and to send the collected information to a collection server.

6. A method comprising:
executing instructions on one or more processing devices such that the one or more processing devices perform the following operations:
accessing a first set of usage data for a first set of resources on a network, the first set of usage data being determined based on information received from monitoring applications installed on a first group of client systems that accessed the first set of resources, wherein users of the first group of client systems are a sample of a larger group of users that use resources on the network;
accessing a second set of usage data for a second set of resources on the network, the second set of resources having been accessed by a second group of client systems and the second set of usage data being determined based on information received from the second group of client systems sent as a result of beacon instructions included with the second set of resources;
determining projection weights based on the first set of usage data and the second set of usage data, wherein the determined projection weights are configured to project usage of the first set of resources by the users of the first group of clients systems to usage of the first set of resources by users in the larger group of users, and wherein determining the projection weights includes:
dividing the first set of usage data into multiple subsets of data;
determining targets for each of the multiple subsets of data based on the second set of usage data; and
determining the projection weights by reducing an error represented by a difference between the determined targets and weighted values derived from the first set of usage data;
applying the projection weights to the first set of usage data to generate projected usage data that reflects usage of the first set of resources by users in a larger group of users; and
generating one or more reports regarding usage of one or more of resources in the first set of resources based on the projected usage data.

7. The method of claim 6, wherein the second set of resources includes at least one resource included in the first set of resources and the second group of client systems includes at least one client system included in the first group of client systems and at least one client system not included in the first group of client systems.

8. The method of claim 6, wherein the second set of resources comprise web pages and the beacon instructions comprise script included in the web pages.

9. The method of claim 8, wherein the script is configured to send a message to a collection server, wherein the message includes a uniform resource locator corresponding to the web page in which the script is included.

10. The method of claim 6, wherein the monitoring application is configured to monitor network activity of the client systems on which the monitoring application is installed, to collect information about the monitored network activity, and to send the collected information to a collection server.

\* \* \* \* \*